United States Patent Office 3,131,156
Patented Apr. 28, 1964

3,131,156
PREPARATION OF A SILICA-ALUMINA
CRACKING CATALYST
Charles P. Wilson, Jr., Cincinnati, Ohio, and Frank G.
Ciapetta, Silver Spring, and James W. Elston, Jr., Baltimore, Md., assignors to W. R. Grace & Co., New York,
N.Y., a corporation of Connecticut
No Drawing. Filed Oct. 21, 1960, Ser. No. 63,982
6 Claims. (Cl. 252—455)

This invention relates to petroleum cracking catalysts and more particularly to a process for preparing silica-alumina composites having a high alumina content which are suitable for such use.

Silica-alumina cracking catalysts are generally prepared by neutralizing an alkali metal silicate solution with a mineral acid, adding alum solution to the resulting hydromineral acid, adding alum solution to the resulting hydrogel to incorporate the requisite amount of alumina in the final catalyst, and precipitating the alum as alumina by the addition of a suitable base.

U.S. Patent No. 2,886,512 discloses substitution of carbon dioxide for the mineral acid to neutralize the silicate and thereby form a slurry of silica hydrogel particles containing dissolved alkali metal carbonate. The patented process is admirably suited for preparing catalysts containing about 10–15% alumina when employing silicate solutions having a silica:alkali metal oxide ratio of about 3.0:1 to 3.4:1. The use of carbon dioxide eliminates the need of adding a basic reagent, such as ammonia, to precipitate the alumina since the residual alkali metal carbonate resulting form the silicate neutralizing step fulfills the reagent's function.

To prepare catalysts having alumina concentrations in excess of about 15%, it is necessary to supplement the amount of available carbonate by the external addition of a large quantity of base, or by resorting to the use of silicate solutions having an increased amount of alkali metal oxide to develop the requisite amount of carbonate. For example, with silicates of $SiO_2:Na_2O$ ratios approaching 1:1, catalysts containing up to about 30% $Al_2O_3$ may be prepared without the external addition of a basic precipitant.

The present invention is concerned with the preparation of high alumina catalysts from alkali metal silicate solutions having a silica to alkali metal ratio of about 3.0:1 to 3.5:1 without resorting to the use of external additions of basic precipitating agents or adding only minor amounts, thereof, depending on the desired proportion of alumina in the final catalyst. This is accomplished by adding an alum solution which has been treated to reduce the sulfate concentration to a sodium silicate solution which has been gelled by the addition of carbon dioxide. The alkali in the silica gel is sufficient to precipitate the alumina from the alum solution. A catalyst containing up to about 25% active alumina can be prepared using this technique.

Briefly, the process of this invention comprises preparing an alum solution by the reaction of sulfuric acid and alumina, adding calcium carbonate to remove a portion of the sulfate present and reduce the sulfate ratio in the alum solution, so that approximately 35–50% of the acid in the alum is neutralized. This alum solution is then added to an alkali metal silicate solution which has been gelled by contacting the silicate with carbon dioxide to form a silica hydrogel. The hydrogel is commingled with the partially neutralized alum solution so that sufficient alumina is precipitated to provide at least 25% active alumina in the final catalyst. The resulting composite is purified and dried.

According to this process, using an alkali metal silicate such as sodium silicate, having a silica to soda ratio of about 3.3:1, there is provided sufficient sodium carbonate by the addition of carbon dioxide to the silicate to precipitate about 25% alumina from the alum solution that has been treated to reduce acidity.

The common practice in the commercial production of high alumina cracking catalysts, in both acid as well as $CO_2$ gelation processes, is to complete precipitation of alumina through the addition of ammonium hydroxide solutions. For example, where 25% alumina catalysts have been produced commercially using both acid and $CO_2$ gelation, it has been the practice to insure satisfactory processing to use up to 35% excess ammonia over the stoichiometric amount in order to effectively precipitate the required amount of alumina. When lesser quantities of ammonia have been used an unstable particle was obtained which blinded the filter cloth in recovering the solid components from the slurry. Frequently, this has caused a breakdown in filtration systems causing the removal of the units from production for repair and cleaning. In preparing a high alumina catalyst according to the process of this invention, addition of extraneous basic precipitant is eliminated or substantially reduced.

In carrying out the process of the present invention an alum solution is prepared. An aqueous slurry of calcium carbonate is added to the alum solution in an amount which is insufficient to completely neutralize the alum. Since alum solutions are prepared by dissolving aluminum hydrate in sulfuric acid, the solution often contains about 1–2% free sulfuric acid. The calcium carbonate is previously ground to a finely divided form for intimate contact with the alum. The addition of calcium carbonate is stopped at a pH below that which any aluminous precipitant is formed. This has been found to be at a pH of not more than 3.5 to 3.7 using an alum solution containing 94 g. per liter of alumina ($Al_2O_3$). The addition is carried out at a temperature below 110° F. If the calcium carbonate addition is continued to a pH above 3.5 to 3.7, the product recovered will form an unstable sol. Under the prescribed conditions, not less than 35% and up to 50% of the alum is neutralized while at the same time all of the alumina remains in solution as a basic aluminum sulfate sol.

Following the addition of the requisite amount of calcium carbonate, the basic aluminum sulfate sol is separated by suitable means such as filtration from the precipitated calcium sulfate and recovered as the filtrate for further processing. A significant feature of this process is the simplicity with which appreciable amounts of a principal impurity, that is sulfate ion, is removed.

Following removal of calcium sulfate, the basic aluminum sulfate sol is commingled with silica hydrogel prepared from an alkali metal such as a sodium silicate solution having a silica to alkali metal oxide ratio of about 3:1 to 3.4:1. Carbon dioxide is added to this sodium silicate solution. This addition results in neutralization of the soda in the silicate to form a silica hydrogel containing dissolved sodium carbonate. Neutralization is carried out to completion, i.e., a stoichiometric amount of carbon dioxide based on the $Na_2O$ concentration of the sodium silicate solution will be employed. This may be accomplished by bubbling carbon dioxide gas into a vessel containing the sodium silicate solution or the sodium silicate may be contacted with the carbon dioxide in a mixing nozzle. Regardless of the mixing method, the reactants are thoroughly agitated during contact and through formation of a silica hydrogel. The resulting slurry exhibits an alkaline pH in an order of 9.0 to 10.5.

A sodium silicate solution having a silica to soda ratio of about 3.3:1 will yield one mole of sodium carbonate. This amount will subsequently precipitate one-third mole of alumina from an untreated aluminum sulfate solution, for example. Theoretically, then, if the alum solution were not treated to remove a portion of the sulfate ion, the reaction between the silicate and carbon dioxide will ultimately yield a synthetic silica-alumina catalyst containing about 14.5% by weight alumina. The addition of the calcium carbonate to remove up to 50% of the sulfate ion present as calcium sulfate allows the addition of sufficient quantity of treated alum solution to increase the alumina content of the final catalyst up to about 25% by weight without the need of external addition of basic precipitant.

Because of the insolubility of the calcium sulfate, alum (aluminum sulfate) is used to provide the alumina for the catalyst composite.

The ratios of silica hydrogel and basic aluminum sulfate sol are adjusted so that the basic aluminum sulfate sol is added in an amount sufficient to react completely with the sodium carbonate present in the mixture and cause precipitation of the alumina. After all of the basic aluminum sulfate sol is added, the pH of the resulting mixture drops to about 6.2. Attendant with alumina precipitation, there is a liberation of carbon dioxide which is recovered and reused in neutralizing the sodium silicate solution in the initial step of the process.

As stated hereinbefore, neutralization of a sodium silicate solution having a silica to soda ratio of about 3.0:1 to about 3.4:1 will produce theoretically sufficient alkali to precipitate a maximum of about 15% alumina from an untreated alum solution. The alumina content is increased to 25–30% by the addition of a sufficient amount of calcium carbonate to the alum solution to remove at least 35% and up to 50% of the sulfate ion as calcium sulfate. The calcium sulfate being insoluble is removed by filtration and the resulting basic aluminum sulfate reacted with the silica hydrogel to give an active alumina content of about 25%.

Thereafter, the slurry is filtered to recover the silica-alumina composite, which is then dried, washed and re-dried. The order of washing and drying may be varied. If desired, the filtered material may be washed prior to drying and the washed material is then spray dried to form silica-alumina microspheres. Washing is preferably carried out with heated dilute ammonium sulfate solutions followed by a rinse with heated deionized water.

The invention is further illustrated by the following specific but non-limiting examples.

EXAMPLE I

A water slurry of pulverized calcium carbonate was added to 15 gallons of alum solution containing 98 grams per liter of alumina and 16.7 grams per liter of excess free sulfuric acid over that combined with the alumina as alum. The calcium carbonate was prepared as a 50–50 slurry in water. The addition was continued until a total of 20 pounds of calcium carbonate (dry basis) had been added. The addition was made at room temperature over a period of approximately 40 minutes. At the end of this period the pH of the alum solution was 3.6. The addition was made in a vessel equipped with a centrifugal pump so that the solution could be both agitated mechanically and mixed by circulating through the centrifugal pump and back into the mixing tank. After the addition of the calcium carbonate was complete, the calcium sulfate was removed as a precipitate by filtering off the soluble aluminum oxysulfate. The filtrate was recovered and commingled with silica hydrogel prepared as follows:

A 130 pound lot of silica gel containing 4.4% $SiO_2$ and 1.33% $Na_2O$ was prepared by the addition of carbon dioxide to a sodium silicate solution. The silica gel was aged in a large tank for 30 minutes at 100° F. after having been previously aged after gelation for 45 minutes at 100° F.

This 130 pound lot of silica gel was added to 28 pounds of the basic aluminum sulfate sol which contained 6.43% $Al_2O_3$ and 9.3% $SO_4$. The slurry was mixed thoroughly. At the end of the addition of basic aluminum sulfate, the pH was 6.2. The slurry was filtered, reslurried with water, and then spray dried. The dried product was washed with a 2° Baumé ammonium sulfate solution at 130° F. and a pH of 9.0, and then rinsed with deionized water at 130° F. and a pH of 9.0. The washed product was finally dried at 300° F.

Analyses of the silica-alumina catalyst prepared according to the process described in the foregoing example are set forth in the following Table I. Surface area and pore volume of the product were determined by nitrogen adsorption measurements according to the well known Brunauer-Emmett-Teller (BET) method after heating for 3 hours at 1000° F.

Table I

CHEMICAL ANALYSES

| | Wt. percent |
|---|---|
| $Al_2O_3$ | 27.08 |
| $Na_2O$ | 0.021 |
| $SO_4$ | 0.32 |

PHYSICAL PROPERTIES

| | |
|---|---|
| Surface area, m.²/g | 382 |
| Pore volume, cm.³/g | 0.64 |

The catalytic cracking activity and stability of the catalyst prepared according to the procedure of this example were determined as follows:

A sample of catalyst was compressed into pellets and the pellets were deactivted by treatment in an atmosphere of steam at 60 p.s.i.g. and 1050° F. for 24 hours. 200 ml. of deactivated catalyst were then placed in a reactor and maintained at a temperature of 850° F. During a 2 hour period 238.2 ml. of virgin East Texas light gas oils were passed through the hot catalyst and the cracked products were recovered and separated. The fraction which distilled below 400° F. as well as gas and loss were determined and designated as the distillate plus loss, or more simply, $D+L$. The results of this test are as follows:

Table II

| | |
|---|---|
| $D+L$ | 31.4 |

From the foregoing description and results it will be appreciated that the process of this invention produces satisfactory catalysts having high alumina content which are comparable in many respects to the 25% active alumina catalysts now in commercial use. In addition, economic advantage is realized in the elimination or substantially total elimination of the prior art practice of resorting exclusively to the use of external amounts of basic precipitant to obtain the increased alumina content.

Obviously many modifications and variations of the invention as hereinabove set forth may be made without departing from the essence and scope thereof and only such limitations should be applied as are indicated in the appended claims.

What is claimed is:

1. A process for preparing a silica-alumina hydrocarbon cracking catalyst which comprises providing an alkali metal silicate solution having a silica to alkali metal oxide ratio of about 3:1 to 3.4:1, contacting said silicate solution with carbon dioxide in an amount sufficient to convert substantially all of the free alkali in the silicate to alkali metal carbonate and form a silica hydrogel containing dissolved carbonate, preparing a basic aluminum sulfate sol by adjusting an aluminum sulfate solution containing sufficient alumina to give about 25% active alumina in the final catalyst to a pH of about 3.7 with calcium carbonate, commingling the silica hydrogel with said sol thus reacting substantially completely with the residual sodium carbonate and thereby precipitating the basic aluminum sulfate as alumina and purifying and drying the resulting composite.

2. A process according to claim 1 wherein the alkali metal silicate is sodium silicate.

3. A process for preparing a silica-alumina hydrocarbon cracking catalyst which comprises providing a sodium silicate solution having a silica to sodium-oxide ratio of about 3:1 to 3.4:1 and heating to a temperature of about 100–125° F., contacting the silicate solution with carbon dioxide in an amount sufficient to form a silica hydrogel and convert substantially all of the sodium oxide in the sodium silicate to sodium carbonate, aging the silica hydrogel for about 1 hour at a temperature of about 100° F., preparing a basic aluminum sulfate sol by contacting an aqueous solution of aluminum sulfate containing sufficient alumina to give about 25% active alumina in the final catalyst with an aqueous slurry of calcium carbonate in an amount sufficient to react with about 35–50% of the sulfate present in the aluminum sulfate solution, commingling the silica hydrogel with said sol thus reacting substantially completely with the residual sodium carbonate and thereby precipitating the basic aluminum sulfate as alumina and purifying and drying the resulting silica-alumina composite.

4. A process for preparing a silica-alumina cracking catalyst containing about 25% alumina which comprises providing an aqueous sodium silicate solution having a silica to sodium oxide weight ratio of about 3:1 to 3.4:1 and heating to a temperature of about 100° F., contacting the silicate solution with carbon dioxide in an amount sufficient to form a silica hydrogel and convert substantially all of the sodium oxide in the silicate to sodium carbonate, aging the resulting mass for about 1 hour at a temperature of about 100° F., preparing a basic aluminum sulfate sol by adjusting an aluminum sulfate solution containing sufficient alumina to supply all of the active alumina in the final catalyst to a pH of about 3.7 with calcium carbonate, commingling the silica hydrogel with said sol thus reacting substantially completely with the residual sodium carbonate and causing precipitation of the basic aluminum sulfate as alumina, filtering the resulting composite, reslurrying the solids with water, spray drying the slurry and washing and drying the resulting silica-alumina composite.

5. A process for preparing a silica-alumina cracking catalyst containing about 25% alumina which comprises providing an aqueous sodium silicate solution having a silica to sodium oxide weight ratio of about 3.3:1, heating said solution to a temperature of about 100° F., contacting said solution with carbon dioxide in an amount sufficient to form a silica hydrogel and convert substantially all of the sodium oxide in the silicate to sodium carbonate, aging the resulting mass for about 1 hour at a temperature of about 100° F., preparing a basic aluminum sulfate sol by adjusting a quantity of aluminum sulfate solution sufficient to give about 25% alumina in the final catalyst and containing about 98 grams per liter of alumina with a quantity of a 1:1 slurry of calcium carbonate and water sufficient to adjust the pH to about 3.7, adding said sol to said hydrogel thus reacting substantially completely with the residual carbonate and causing precipitation of the basic aluminum sulfate as alumina, filtering the resulting silica-alumina composite, reslurrying the solids with water, spray drying the slurry, washing the spray dried product with an ammonium sulfate solution and redrying the resulting particles.

6. A process for preparing a silica-alumina cracking catalyst containing about 25% alumina which comprises providing an aqueous sodium silicate solution having a silica to sodium oxide weight ratio of about 3.3:1, heating said solution to a temperature of about 100° F., contacting said solution with carbon dioxide in amount sufficient to form a silica hydrogel and convert substantially all of the sodium oxide in the silicate to sodium carbonate, aging the resulting mass for about 1 hour at a temperature of about 100° F., preparing a basic aluminum sulfate sol by adjusting a quantity of aluminum sulfate solution sufficient to give about 25% alumina in the final catalyst and containing about 98 grams per liter of alumina with a quantity of a 1:1 slurry of calcium carbonate and water sufficient to adjust the pH to about 3.7, adding said sol to said hydrogel thus reacting substantially completely with the residual carbonate and causing precipitation of the basic aluminum sulfate as alumina and releasing carbon dioxide gas, recirculating said gas to the hydrogel preparation step, filtering the resulting silica-alumina composite, reslurrying the solids with water, spray drying the slurry, washing the spray dried product with a dilute ammonium sulfate solution and redrying the resulting particles.

References Cited in the file of this patent
UNITED STATES PATENTS

| | | |
|---|---|---|
| 2,886,512 | Winyall | May 12, 1959 |
| 3,066,092 | Winyall | Nov. 27, 1962 |